May 29, 1956  S. STRAND  2,747,893
VEHICLE TOWING BUMPER CLAMP
Filed Jan. 11, 1955
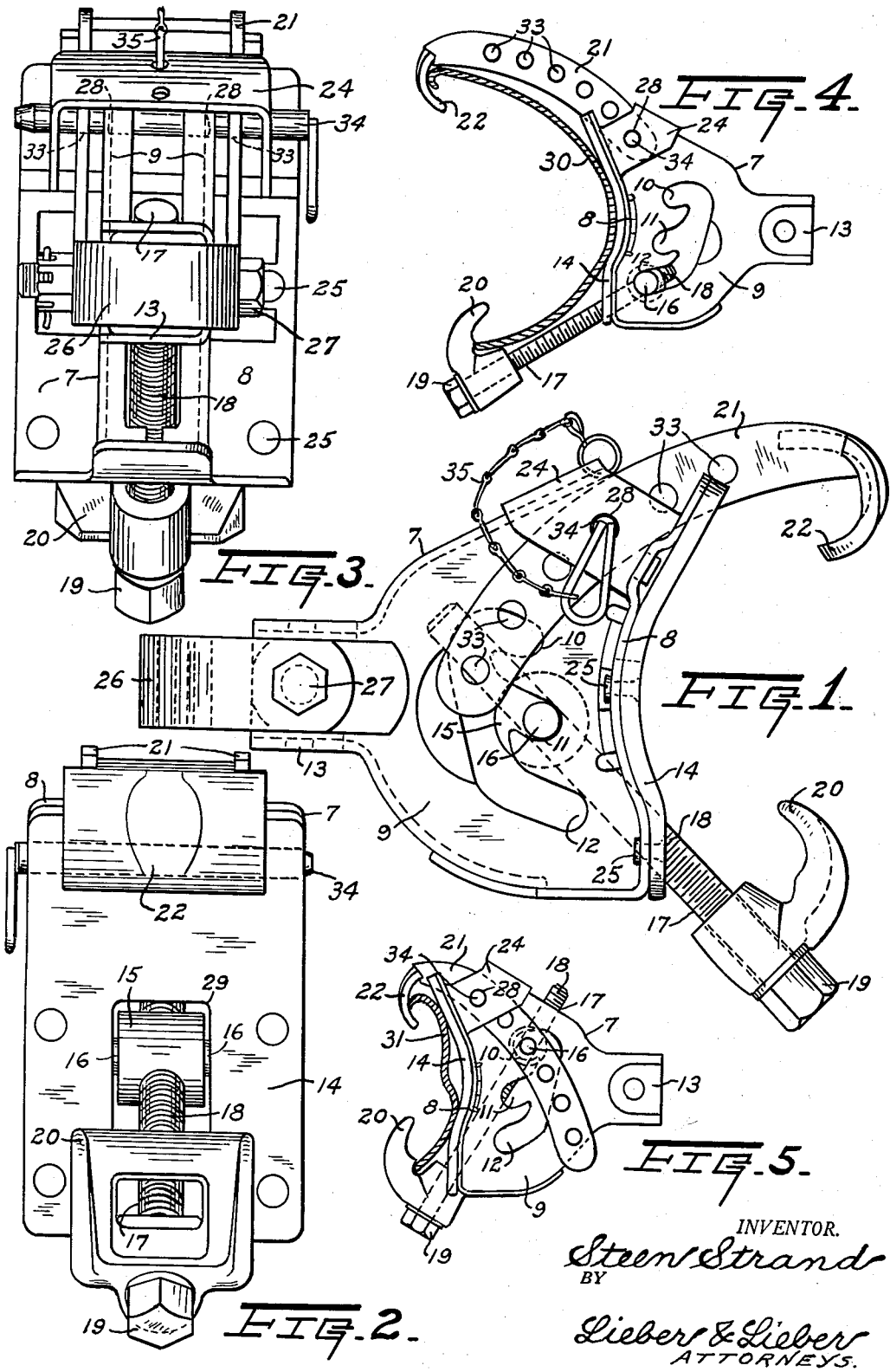
INVENTOR.
Steen Strand
BY
Lieber & Lieber
ATTORNEYS.

United States Patent Office 2,747,893
Patented May 29, 1956

2,747,893
VEHICLE TOWING BUMPER CLAMP

Steen Strand, West Allis, Wis., assignor to The Fulton Company, West Allis, Wis., a corporation of Wisconsin Application January 11, 1955, Serial No. 481,055

3 Claims. (Cl. 280—502)

This invention relates generally to improvements in appliances for facilitating the haulage of stalled vehicles or the like, and relates more specifically to improvements in the construction and operation of bumper attachable tow clamps for automobiles and trucks.

The primary object of the present invention is to provide an improved vehicle towing bumper clamp which is simple but durable in construction and which is effectively cooperable with diverse styles of vehicle bumpers.

Various types of towing assemblages for automobiles and the like, have heretofore been proposed and some have also been used extensively. Most of these vehicle towing rigs include one or more clamps adapted to be detachably secured to one of the front or rear bumper bars of the vehicle which is to be hauled, and in some cases such clamps may also be associated with the bumpers of the towing vehicles. Since the bumper bars of different makes of automobiles and trucks have a wide variety of sizes and shapes, these attaching clamps of the towing devices, must necessarily be adjustable to fit the bumpers of any standard automotive vehicles of old or new vintage.

While many of the prior vehicle towing clamps have provided some adjustability, most of these adjustments could be made only with considerable difficulty and effort, and none of the previous clamps were adapted to cooperate with any of the existing commercial bumper bars in a manner whereby the draft force was properly applied to the tow clamps. Then too, many of the prior bumper clamps could not be quickly applied and removed due to their complicated construction and bulkiness, and while some were heretofore formed primarily of sheet metal these were not sufficiently strong to effectively withstand the hard usage and abuse to which such devices are normally subjected.

It is therefore, an important object of this invention to provide an improved bumper type tow clamp which is far more flexible in its adaptations, and which obviates all of the above mentioned defects of the prior clamps of this type.

Another important object of the invention is to provide a clamp capable of effectively gripping bumper bars having wide or narrow cross-sections of any standard shape, and which are associated with either old or more recent automobile models.

A further important object of the present invention is to provide a bumper clamp in which the pulling forces are most effectively distributed and applied regardless of the type of bumper with which the clamp is associated.

Still another important object of this invention is to provide an improved vehicle towing clamp which may be sturdily formed primarily of sheet metal with the aid of simple punches and dies, and produced at moderate cost for diverse uses.

An additional important object of the invention is to provide a quickly attachable and detachable bumper clamp, which is safely manipulable by a novice and will not mar the finish of the bumpers to which it is applied.

Another important object of this invention is to provide a light but exceedingly strong tow clamp assemblage of compact construction so that it may be readily packed and stored in minimum space when not in use, and which is also devoid of separable parts which might become misplaced or lost.

These and other objects and advantages of the invention will be apparent from the following detailed description.

A clear conception of the features constituting the present improvement, and of the construction and operation of one typical commercial embodiment of the invention, may be had by referring to the drawing accompanying and forming a part of this specification in which like reference characters designate the same or similar parts in the various views.

Fig. 1 is a side elevation of a commercial vehicle towing bumper clamp embodying the invention;

Fig. 2 is a rear end view of the clamp shown in Fig. 1, looking toward the clamping jaw elements;

Fig. 3 is a front end view of the same bumper clamp looking toward the draft portion thereof;

Fig. 4 is a reduced side view of the same clamp showing the same applied to a bumper bar of maximum transverse cross-section; and Fig. 5 is a similarly reduced side view of the bumper clamp showing the same applied to a bumper bar of minimum transverse cross-section.

While the invention has been shown and described herein as having been embodied in a clamp formed primarily of sheet metal and adapted to be connected to a hauling vehicle either by means of linkage or a ball and socket type of trailer coupling, and to either the front or rear bumper bar of an automobile or truck, it is not the intent to unnecessarily restrict the use of the improved features by virtue of this limited embodiment; and it is also contemplated that specific descriptive terms employed herein be given the broadest possible interpretation consistent with the actual disclosure.

Referring to the drawing, the improved vehicle towing bumper clamp illustrated therein comprises in general, a frame 7 having a rear wall 8 interconnecting spaced side walls 9 provided with several sets of pivot sockets 10, 11, 12 and also having a draft applying portion 13 located forwardly of the sockets; a resilient bumper engaging pad 14 mounted upon the wall 8 rearwardly of the sockets 10, 11, 12; a swing nut 15 disposed between the side walls 9 and having alined pivots 16 interchangeably cooperable with the sockets 10, 11, 12; an elongated lower member or bolt 17 having a threaded shank 18 adjustable within the nut 15 and also having a hex-head 19 at its lower extremity; a lower bumper edge clamping element 20 carried by the bolt 17 and coacting with the head 19; an elongated arcuate upper member 21 slidably adjustable relative to the frame 7; and an upper bumper edge clamping element 22 carried by the upper extremity of the member 21.

The main frame 7 may be durably constructed of several sheet metal parts welded or otherwise rigidly united, and the opposite side walls 9 are provided with inwardly directed reenforcing flanges the front portions of which overlap to produce a box section at the draft portion 13, as shown in Figs. 1 and 3. The rear wall 8 is of L-shape and besides being firmly attached to the rear portions of the inwardly directed flanges of the side walls 9 at the bottom and rear, this rear wall has a transverse inverted U-shaped yoke 24 rigidly secured to its upper portion and which is also firmly attached to the frame walls 9 at the top. The upright pad 14 is of considerable length and width and may be formed of any suitable material such as rubber or rubber composition, being secured to the rear wall 8 of the frame 7 by means of rivets 25. The draft portion may be pivotally attached by a clevis 26 and a bolt 27 to linkage or a ball coupling associated with a hauling vehicle of any suitable type, and the rear frame wall 8 and pad 14 are preferably provided with a vertically elongated opening 29 while the frame walls 9 and the side walls of the yoke 24 have four alined holes 28 therein, as shown in Figs. 1 and 2.

The opposite end pivots 16 of the swing nut 15 may be interchangeably applied to any of the sets of alined sockets 10, 11, 12 depending upon the style of bumper bar 30, 31 to which the clamp is to be applied, and the large opening 29 in the rear frame wall 8 and pad 14 provides ample clearance for the threaded element 17 when the swing nut 15 is shifted from one set of these sockets to another. The elongated lower clamp supporting element 17 may be an ordinary bolt having a threaded shank 18 of sufficient length to effect the required adjustments, and the lower clamping jaw or element 20 is preferably provided with a large hook capable of engaging the lower edge portions of bumper bars 30, 31 of various cross-sectional shapes including others in addition to those specifically illustrated.

The arcuate upper clamping jaw supporting member 21 is of composite formation comprising a pair of laterally spaced curved sheet metal bars interconnected by the upper jaw or hook element 22. These curved bars are slidably cooperable with the yoke 24, and are provided with a series of alined holes 33 adapted to interchangeably register with the four holes 28 formed in the side walls of the yoke and frame. A locking pin 34 is insertible through the holes 28 and the selected alined holes 33 in the member 21, to retain the latter in the selected position of adjustment, and the pin 34 is attached to the main frame 7 by means of a cable or chain 35 in order to prevent possible loss of the pin. It is to be noted that while the upper member 21 may be locked in various positions of adjustment by the pin 34, it is still able to rock about this pin during clamping operation, and the same is true of the lower member 17.

When the improved bumper clamp unit has been constructed as hereinabove described, it may be quickly and effectively applied to firmly grip various types of bumpers 30, 31 as follows. If the bumper 30 has a transverse cross-section such as shown in Fig. 4, of considerable vertical height and horizontal width, the pivots 16 of the swing nut 15 should be initially applied to the lowermost frame sockets 12, and the holding pin 34 should likewise be initially applied to the lowermost holes 33 of the upper member 21 and to the four alined holes 28 of the walls 9 and yoke 24. The bolt element 17 should then be rotated in one direction sufficiently to retract the lower hook element 20 far enough to permit the upper hook element 22 to be applied to the upper edge of the bumper bar 30, and the clamp to be swung into horizontal position. When this has been done, the clamp may be swung downwardly so as to bring the resilient pad 14 into engagement with the medial portion of the bumper 30, whereupon a few turns of the lower bolt member 17 in the opposite direction will bring the clamping element 20 into firm clamping engagement with the lower edge of the bumper bar.

If the bumper 31 has a transverse cross-section of relatively short vertical height and of small width, such as shown in Fig. 5, then the pivots 16 of the swing nut 15 should be initially applied to the uppermost frame sockets 10, and the holding pin 34 should also be initially applied to the uppermost holes 33 of the upper member 21 and to the four alined holes 28 of the yoke 24 and frame walls 9. The bolt 17 should then be rotated sufficiently in one direction to retract the lower clamping element 20 far enough so as to permit the upper clamping element 22 to be applied to the upper edge of the bumper bar and to also enable the clamp assemblage to be swung into horizontal position. The clamp may thereafter be swung downwardly so as to bring the resilient pad 14 into engagement with the medial portion of the bumper 31, after which a relatively few revolutions of the bolt member 17 in the opposite direction will cause the lower clamping element 20 to firmly engage the lower edge of the bumper bar.

The improved clamp assemblage may obviously be likewise rapidly and effectively applied to other bumpers having various transverse cross-sections of intermediate height and width and of different shapes; and when the lower clamping element 20 is forced into clamping engagement with the lower edge of the bumper bar, the upper element 22 is also forced into such engagement with the upper edge of the bar and the medial portion of the bumper is simultaneously driven firmly against the pad 14. Whenever the lower clamping element 20 is driven home, both its supporting bolt member 17 and the upper clamp carrying member 21 may swing about their respective pivots 16, 34 so as to automatically cause the longitudinal central plane of the clamp unit to assume horizontal position thereby most effectively distributing the clamping forces throughout the entire assemblage, and when the towing pull is applied to the clevis 26 the traction force is always directed horizontally in this central plane of the unit regardless of the cross-sectional size and shape of the bumper.

From the foregoing detailed description it will be apparent that the present invention in fact provides a bumper clamp unit which besides being rapidly and conveniently applicable to various types of bumpers, also most effectively distributes the towing forces whenever applied to diverse styles of bumper bars. The improved assemblage is very compact and may be durably constructed primarily from relatively light sheet metal and at moderate cost, and the elongated resilient pad 14 will coact with the medial portions of bumpers of widely varying shapes without marring the same. The improved clamp can also be quickly and easily removed by merely manipulating the single bolt member 17, and the provision of the series of sockets 10, 11, 12 cooperable with the pivots 16 and of the series of holes 33 cooperable with the pin 34, makes it possible to make rapid initial adjustments of the clamping jaws so that final clamping may be quickly effected with the aid of the threaded bolt 17 and nut 15. The improved clamping units may be produced in various sizes from diverse uses, and have proven highly efficient and successful in actual commercial use.

It should be understood that it is not desired to limit this invention to the exact details of construction and operation of the tow clamp, herein shown and described, for various modifications within the scope of the appended claims may occur to persons skilled in the art.

I claim:

1. In a vehicle towing bumper clamp, a unitary draft frame having spaced walls provided with a series of spaced sets of alined pivot sockets and also having a draft applying portion located forwardly of and integrally uniting said sockets, a resilient bumper engaging pad mounted upon said frame rearwardly of said sockets, a swing nut having alined pivots interchangeably cooperable with said socket sets, an elongated lower member longitudinally adjustable directly through and relative to said swing nut, a lower bumper edge clamping element fixedly carried by said lower member remote from said swing nut, an elongated upper member longitudinally adjustable relative to said frame, means for retaining said upper member in various positions of adjustment, and an upper bumper edge clamping element carried by said upper member remote from said sockets, said members being relatively movable to cause said elements to force the medial portion of an intervening bumper against said pad.

2. In a vehicle towing bumper clamp, a unitary draft frame having a rear wall interconnecting spaced upright side walls provided with a series of superimposed sets of horizontally alined pivot sockets and also having a draft applying portion located between said walls forwardly of and integrally uniting said sockets, a vertically elongated resilient bumper engaging pad mounted upon said rear wall rearwardly of said sockets, a swing nut confined between said side walls and having alined pivots interchangeably cooperable with said socket sets, an elongated lower member having a threaded upper end portion adjustable directly through said nut, a lower bumper edge clamping element fixedly carried by said lower member remote from said swing nut, an elongated upper member slidably adjustable relative to said side walls, means for retaining said upper member in various positions of adjustment, and an upper bumper edge clamping element carried by said upper member remote from said sockets, said members being relatively movable to cause said elements to force the medial portion of an intervening bumper against said pad.

3. In a vehicle towing bumper clamp, a unitary draft frame having a yoke and a rear wall interconnecting spaced side walls provided with several superimposed sets of horizontally alined pivot sockets and also having a draft applying portion located between said walls forwardly of said sockets, a resilient bumper engaging pad mounted upon said rear frame wall rearwardly of and extending above and below all of said sockets, a swing nut confined between said side walls and having horizontally alined pivots interchangeably cooperable with any selected set of said sockets, an elongated bolt having a threaded upper end portion adjustable directly through said nut transversely of said pivots, a lower bumper edge clamping hook carried by said lower bolt remote from said swing nut, an elongated arcuate upper member slidably adjustable within said yoke, means for retaining said upper member in various positions of adjustment, and an upper bumper edge clamping hook secured to said upper member remote from said sockets, said bolt being adjustable within said swing nut to always cause said hooks to force the medial portion of an intervening bumper against said pad in horizontal alinement with said draft applying frame portion.

References Cited in the file of this patent
UNITED STATES PATENTS

| | | |
|---|---|---|
| 2,306,007 | Thorp | Dec. 22, 1942 |
| 2,673,095 | Fulton | Mar. 23, 1954 |